US006582546B1

(12) United States Patent
Micek

(10) Patent No.: US 6,582,546 B1
(45) **Date of Patent: *Jun. 24, 2003**

(54) TRANSPARENT NOTE PADS AND KIT THEREFOR

(76) Inventor: Janice H Micek, 220 Williamstown Way, Columbia, SC (US) 29212

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/513,114

(22) Filed: Feb. 25, 2000

(51) Int. Cl.[7] ................................................ B32B 31/00

(52) U.S. Cl. ....................... 156/249; 156/277; 156/281; 283/67; 283/101; 283/102

(58) Field of Search ............................... 428/40.1, 42.1, 428/192, 194, 203, 354; 283/67, 117, 39, 40, 101, 102; 412/1, 10, 67; 156/247, 277, 249, 281

(56) References Cited

U.S. PATENT DOCUMENTS 1,510,110 A * 9/1924 Schmidt
1,614,838 A * 1/1927 Gorin
2,195,646 A * 4/1940 Green
2,791,040 A * 5/1957 Santorelli
3,324,823 A * 6/1967 Peters
3,492,743 A * 2/1970 Schmidt
4,543,316 A * 9/1985 Thoese ....................... 428/201
4,590,109 A * 5/1986 Holmberg ............... 156/247 X
4,832,373 A * 5/1989 Swan
4,970,984 A * 11/1990 Vazquez
4,980,212 A * 12/1990 Marquis et al.
5,011,191 A * 4/1991 Gannon et al.
5,024,332 A * 6/1991 Stachler
5,029,899 A * 7/1991 Schieppati et al.
5,056,825 A * 10/1991 Templet
5,153,041 A * 10/1992 Clements et al.
5,242,725 A * 9/1993 Weissmann et al.
5,366,776 A * 11/1994 Mertens .................... 283/40 X
5,382,055 A 1/1995 Mertens et al.
5,388,861 A * 2/1995 Reiter ....................... 283/40 X
5,618,062 A 4/1997 Mertens et al.
5,639,240 A * 6/1997 Werzberger
6,159,329 A * 12/2000 Tschanz ...................... 156/277
6,254,955 B1 * 7/2001 Kuo et al.

OTHER PUBLICATIONS

Resources for Readiing, Inc. Highlighter Sheets, 1999 [retrieved Oct. 31, 2002]. Retrieved from the internet:<URL: http://www.abcstuff.com/items/NT005.html/product>.*

Lee Products Company. Removable Highlighter Sheets, 2002 [retrieved Oct. 31, 2002]. Retrieved from the internet:<http://www.leeproducts.com/Highlighter_Sheets.asp>.*

* cited by examiner

*Primary Examiner*—Curtis Mayes
(74) *Attorney, Agent, or Firm*—Townsend M. Belser, Jr.; Nexsen Pruet Jacobs & Pollard, LLC

(57) ABSTRACT

Transparent sheets of acetate carrying a band of adhesive on the reverse side adjacent to one edge can be used for making notes on text and illustrations. Preferably provided in a tablet of plural, stacked sheets and most preferably provided in a kit form with erasable markers adapted for marking on acetate, the sheets may be applied to a whole page of text or to a drawing. The markings can interact with the text and drawings because the underlaying surface is visible through the sheets. Thus, the user may make annotations exactly where and how desired.

21 Claims, 2 Drawing Sheets

TRANSPARENT NOTE PADS AND KIT THEREFOR

1. FIELD OF THE INVENTION

The present invention relates generally to releasible note pads.

2. BACKGROUND OF THE INVENTION

The use of releasible note pads such as those sold by Minnesota Mining and Manufacturing Company under the brand name POST-IT has increased significantly from the time these sheets were first introduced. They have become a staple of the office. These note pads are simply small pieces of paper arranged in tablet form with a band of low-tack pressure sensitive adhesive applied to one side of each near one of its edges. By pressing that edge against a surface, the user secures the note to that surface in a releasible, peelable manner and may then write on the note. The note may be removed when no longer needed, thus avoiding the need to write on the surface itself or the use of thumb tacks, push pins, paperclips, staples or other temporary fasteners to secure a note thereto and that would mar a surface. These note pads enjoy a wide variety of uses, such as bookrmarkers and line markers and may carry instructions and information for the user or for others. POST-IT notes can also be used to give others instructions or information about files and documents by simply sticking one on a file or documents and writing the relevant text on the note.

A releasible note can be applied anywhere on a surface. Therefore, the user will often locate the note adjacent to the portion of the underlying surface containing the text or illustrations the note applies to.

However, releasible notes are not practical for every marking application. For example, if a student wants to highlight key facts on a page of a text book, releasible notes are simply impractical. The student has little choice but to either mark directly on a book with a highlighting marker or keep separate notes. Releasible notes are also not reusable for notations once they are marked on.

To illustrate another application where conventional releasible notes are not practical, making temporary changes to a portion of an illustration is not easily done without marking directly on the illustration or making a photocopy and marking on the copy.

It will be seen that conventional releasible note pads provide a convenient means to convey information and instructions relating to text, a drawing, a document or a file, and to identify the specific location of the text or the illustration of interest. However, conventional releasible note pads are inadequate for making comments that interact with text or illustrations.

For these and other reasons, there remains a need for a better releasible notes for certain applications, particularly those where the user wants to make comments or highlight text or illustrations.

Erasmus Darwin, Charles Darwin's learned father, astonished his friends by the way he handled the books in his considerable library. In a day when books were expensive and rare, he would annotate them and write in the margins and sometimes cut large books in half so as to be able to handle them more easily. His books were, in his estimation, his tools. They were to be used in whatever way worked best for his needs.

Erasmus Darwin would have found the present invention very useful, and his friends would have approved as well.

SUMMARY OF THE INVENTION

According to its major aspects and briefly recited, the present invention is a transparent releasible note sheet for making notations on text, illustrations, etc., that appear through the sheet. The sheet may be larger than conventional note sheets because it can be positioned over text and not adjacent to it. Thus, the present sheets can be dimensioned to cover a full page of text or an illustration.

Each sheet has a band of a low tack, pressure sensitive adhesive applied to one side and near an edge. Plural sheets made of a suitable transparent material such as acetate may be arranged in a tablet form so that each adheres to the one below it and the bottom one is adhered to a releasible backing. Preferably, the present invention is also a kit that includes at least one tablet of transparent releasible sheets and at least one suitable marker, and may also include a cloth or felt eraser and perhaps a scissors to trim sheets for particular uses.

In an alternative embodiment of the present invention, the present transparent sheets may have a mechanical or static electrical attachment rather than a chemical, adhesive, attachment. As an example of a mechanical attachment, to releasibly fasten a transparent sheet to a spiral notebook so that temporary notations can be made on a page, a transparent sheet may have a series of "T" tabs along one side that can be pushed between the spirals. Alternatively, holes may be punched along one side for use in a ringed binder. On a plastic surface, where the static electric attraction with a transparent sheet of acetate would be strong, no adhesive or mechanical attachment would be required.

An important feature of the present invention is the fact that the releasible notes are made of a transparent material. Because the material is transparent, text and illustrations underlaying the sheet are visible through the sheet. Thus, the sheets may be marked to highlight or annotate an underlaying surface without making permanent markings on the surface. The user's comments may then interact with the text or illustrations in a way not practical with conventional releasible note pads.

Another important feature of the present invention is the size of the sheets. Because the sheets do not have to be positioned next to and not covering the text but rather can be placed over the text without obscuring it, they need not be small. Therefore, the size of the present sheets can be large to facilitate marking or highlighting an entire page of text or a drawing.

Yet another important feature of the present invention is that, because, in a preferred embodiment, the releasible sheets are made of acetate and because erasable markers exist for acetate surfaces, the present releasible note sheets can be reused.

Still another important aspect of the present invention is the fact that it can be assembled in the kit that includes at least one tablet and at least one marker so that the user can make the desired notations on a variety of surfaces using contrasting colors for example.

Other features and their advantages will be apparent to those skilled in the art from a careful reading of the Detailed Description of Preferred Embodiments, accompanied by the following drawings.

DETAILED DESCRIPTION OF PREFERRED EMBODIMENTS

Figure 1:
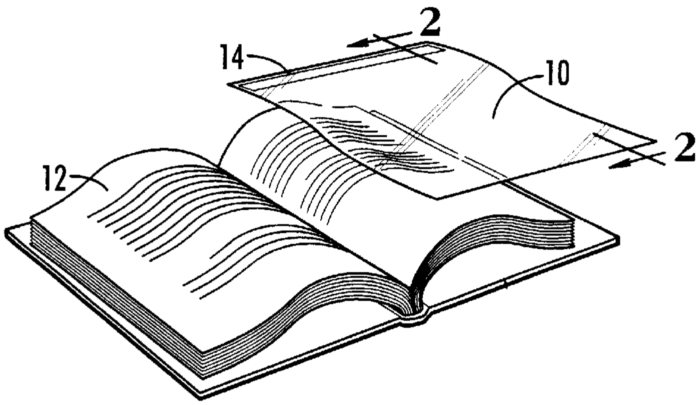
FIG. 1 is a front view of a transparent sheet according to a preferred embodiment of the present invention.
Figure 2:
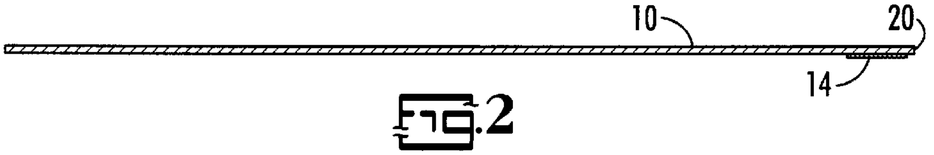
FIG. 2 is a side view of the transparent sheet taken along lines 2—2.

As illustrated in FIGS. 1–3, the present invention is, in one embodiment, individual sheets of a transparent material that carry means for releasibly attaching the sheets to a surface. In an alternative embodiment illustrated in FIG. 4, plural sheets are arranged in a convenient tablet where each can be removed one at a time for use. In a third embodiment shown in FIG. 5, the present invention is a kit that includes at least one tablet of releasable, transparent sheets, at least one marker suitable for marking on the transparent sheets, and, optionally, an eraser and scissors.

The present invention is useful in making non-permanent, erasable annotations and highlights on text and illustrations, and many other uses.

The present transparent sheets 10 are made of a transparent, flexible material suitable for marking. "Transparent" may also include materials that, while not completely transparent, are sufficiently transparent to allow text or drawings can be seen through it. Polymeric materials are of the type having the requisite flexibility to be bent into an arc without cracking. Bending a sheet would be necessary to remove a sheet of material from a tablet and applying it to a surface. Furthermore, polymeric materials may be transparent. Acetate is such a flexible, transparent, polymeric material and will serve the present purpose well.

The sheets may be of any shape or size but are preferably in sizes that correspond to full pages or at least the full surface to be marked, such as 5 inches by 8 inches, 8½ inches by 11 inches, and 8 inches by 14 inches, and be at least approximately 3 mils thick. Each page may be tinted slightly to increase its visibility on white paper (or blueprints) but without obstructing the reading of text or drawings therethrough.

Transparent sheets 10 of the present invention are adapted to be releasibly attachable to a surface 12. Preferably, a low tack, pressure-sensitive adhesive 14 is applied in a thin band on one side of the sheet near at least one edge 20, preferably the top edge. The term "low tack" and "pressure sensitive" adhesive refers to adhesives that are slightly sticky but, when applied to paper with text on it, do not cause the paper to tear or the ink to lift when a substrate carrying the adhesive is pulled from the paper. In short, they are not "aggressive" adhesives. Furthermore, they adhere when the substrate to which they are applied (here, the acetate sheet), is pressed to a surface. These types of adhesives are elastomeric copolymer microspheres disclosed in U.S. Pat. Nos. 3,961140 and 3,857,731, and are well known.

Figure 3A:
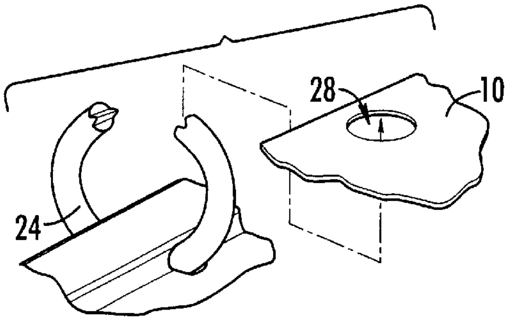
FIGS. 3A and 3B are detailed views of alternative embodiments of the sheet of FIG. 1.
Figure 3B:
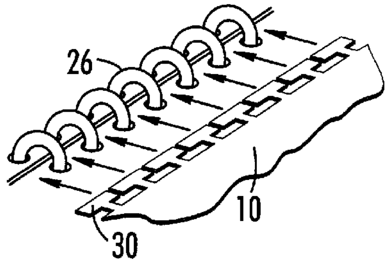
Figure 4:
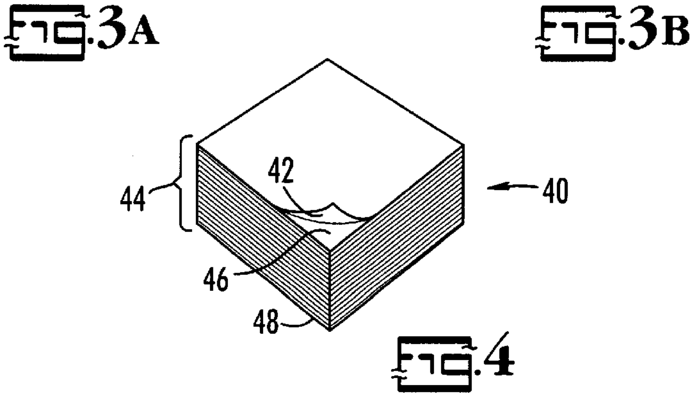
FIG. 4 is a perspective view of a tablet of transparent sheets made according to a preferred embodiment of the present invention.

As an alternative to a band of low-tack, pressure sensitive adhesive, transparent sheets 10 may be modified to attach to the rings 24 of a ring binder or spirals 26 holding the underlaying surface. For example, and as shown in FIGS. 3A and 3B, one edge of a sheet can have holes 28 formed therein for rings 24 of a binder or "T" shaped tabs 30 that can be forced between spirals 26 of a spiral binder. For certain applications, static electricity may provide sufficient attachment depending on the underlaying surface, but a mechanical or adhesive attachment is preferred to maintain orientation.

In addition to individual sheets, the present invention can be in the form of a tablet 40 (FIG. 4) comprising plural sheets 42 in a stack 44, with each sheet 42 having adhesive on its reverse side. The adhesive serves to hold it to the underlaying transparent sheet 46 until it is needed for use. Then sheet 42 is peeled from stack 44 and applied to another surface. The final sheet is adhered to a releasible backing 48 so that it can be peeled from the backing and used, and the backing discarded. Of course, individual sheets may also be provided with a peelable, releasible backing, such as a strip covering the adhesive band.

In the present preferred embodiments, having a marker pen that can mark the transparent sheets is essential. Preferably, the ink from the pen is not permanent and can be erased. Also, most preferably, the ink is water-soluble and fast drying and available in a range of colors. The pen should be of the type that can be made in varying widths so that both highlighters and writing pens can be fashioned. Suitable pens are available under the mark Staedtler.

Figure 5:
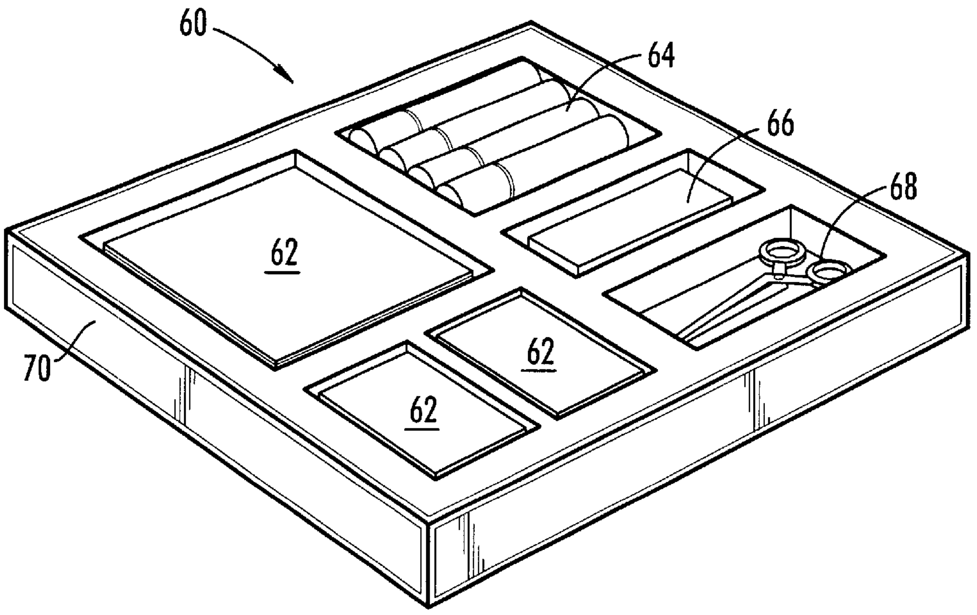
FIG. 5 is a perspective view of a kit including transparent sheet tablets, markers, an eraser and a scissors.

In kit form, as illustrated in FIG. 5, the kit 60 includes at least one tablet 62 of transparent note sheets and a set of marker pens 64 in varying sizes and colors, preferably carried by and organized on a tray 70. The colors would preferably include, but not necessarily be limited to black and blue for writing and black, yellow, green, pink, pale blue and orange for highlighting.

Also, in the kit embodiment of the present invention, an eraser 66 suitable for the removal of ink from acetate can be provided in the form of a small felt or foam pad or a washable cotton or cotton blend cloth for water soluble inks. Alternatively, for inks that cannot be simply wiped by a dry eraser, an applicator bottle containing ink solvent or small towels a few inches square moistened with a suitable quantity of an ink solvent can be provided.

With a kit 60 is made according to the present invention, the user can mark, annotate, correct, comment, edit, revise, alter, illuminate and highlight underlaying information and illustrations on a surface in a non-permanent manner simply by (1) peeling a transparent sheet from a tablet 62 of transparent sheets; (2) applying the transparent sheet from tablet 62 to the surface; and (3) marking on it with the marker pen 64 from kit 60. If the user wishes to change a marking or remove them, the user may simply wipe the sheet clean with eraser 66 from kit 60. If the user wishes to apply a sheet to a surface for a special application where the dimensions of the area to be marked on are smaller than the dimensions of a sheet, the user can use scissors 68 provided optionally with kit 60 to trim the excess material from the sheet.

The present kit is most useful in marking books, especially library and reference books, text books that a student would want to resell after a course, school workbooks, manuals, scripts, music scores, blueprints, maps, diagrams, charts, graphs, x-rays, important documents, calendars, journals, and daily planners.

It will be obvious to those skilled in the art of office supplies that many changes and substitutions may be made to the present preferred embodiments without departing from the spirit and scope of the present invention, which is defined by the appended claims.

What is claimed is:

1. A method of annotating a sheet of text, comprising removing a sheet of transparent material from a stack containing a plurality of transparent sheets, each of said transparent sheets having a first side and a second side and said second side carrying an area of low-tack, pressure sensitive adhesive for releasably adhering said transparent sheet to said textual sheet; adhering said removed sheet to said textual sheet with said adhesive area, said adhered sheet being dimensioned and arranged to cover full lines of text on said textual sheet, and said adhesive area permitting said adhered sheet to be readily separated from said textual sheet; and making notations or highlighting relative to said covered lines of text by applying markings to said first side with a marker, said marker being adapted to apply, and said first side being adapted to receive, markings readily removable by removing means; wherein said stack, said marker and said removing means are parts of a kit further comprising means for trimming said plural sheets and a container for holding said stack, said marker, and said removing means.

2. A method according to claim 1, wherein said method further comprises removing said applied markings with said removing means.

3. A method according to claim 2, wherein said removing means is a moistened material and said applied markings are removed with said moistened material.

4. A method according to claim 1, wherein said transparent sheet has an edge and said adhesive area is applied as a band adjacent to said edge.

5. A method according to claim 1, wherein said transparent sheet is dimensioned and arranged to cover substantially all text on a full sheet of text.

6. A method according to claim 1, wherein said stack defines a tablet and each sheet of said tablet is adhered to another sheet of said tablet by said area of adhesive.

7. A method according to claim 6, wherein a lowermost sheet of said tablet is releasably adhered to a releasable backing.

8. A method according to claim 1, wherein said trimming means is scissors.

9. A method according to claim 1, wherein said kit contains at least two of said stacks and said plural sheets in one stack are formed in one size and said plural sheets in the other stack are formed in a different size.

10. A method according to claim 1, wherein said removing means is selected from the group consisting of cloths, pads, moistened towels and felt erasers.

11. A method according to claim 1, wherein said sheet is made of a tinted transparent material to increase its visibility relative to said textual sheet.

12. A method according to claim 1, wherein said marker applies said markings with an ink that is fast drying and erasable.

13. A method according to claim 1, wherein each of said transparent sheets is provided with a peelable, releasable backing covering said adhesive area.

14. A method of annotating a sheet of text, comprising obtaining a sheet of transparent material from a stack containing a plurality of said transparent sheets; adhering to said textual sheet said obtained sheet, each of said transparent sheets having a first side and a second side, said second side carrying an area of low-tack, pressure sensitive adhesive for adhering said obtained sheet to said textual sheet, said adhered sheet being dimensioned and arranged to cover full lines of text on said textual sheet, and said adhesive area permitting said adhered sheet to be readily separated from said textual sheet; and making notations or highlighting relative to said covered lines of text by applying markings to said first side with a marker; said stack being part of a kit further comprising a container for holding said stack, at least one of said markers, means for readily removing said markings, and means for trimming said obtained sheet to dimension the same.

15. A method according to claim 14, wherein said trimming means is scissors.

16. A method according to claim 14, wherein said sheet is made of a tinted transparent material to increase its visibility relative to said textual sheet.

17. A method according to claim 14, wherein said marker applies said markings with an ink that is fast drying and erasable.

18. A method according to claim 14, wherein each of said transparent sheets is provided with a peelable, releasable backing covering said adhesive area.

19. A method of annotating a sheet of text, comprising removing a sheet of transparent material from a stack containing a plurality of transparent sheets, each of said transparent sheets having a first side, a second side and an edge, and mechanical attaching means being carried along said edge for releasably attaching said transparent sheet over said textual sheet; attaching said removed sheet over said textual sheet with said mechanical attaching means, said attached sheet being dimensioned and arranged to cover full lines of text on said textual sheet, and said mechanical attaching means permitting said attached sheet to be readily separated from said textual sheet; and making notations or highlighting relative to said covered lines of text by applying markings to said first side with a marker, said marker being adapted to apply, and said first side being adapted to receive, markings readily removable by removing means; wherein said stack, said marker and said removing means are parts of a kit further comprising a container for holding said stack, said marker, and said removing means, and wherein said mechanical attaching means is a plurality of T tabs for engaging a spiral binder, or a plurality of punched holes for being engaged by a ring binder.

20. A method according to claim 19, wherein said sheet is made of a tinted transparent material to increase its visibility relative to said textual sheet.

21. A method according to claim 19, wherein said marker applies said markings with an ink that is fast drying and erasable.

* * * * *